US005788286A

United States Patent [19]
Hunt

[11] Patent Number: 5,788,286
[45] Date of Patent: Aug. 4, 1998

[54] CHILDREN'S BOOK WITH HOLOGRAM FEATURES

[75] Inventor: Waldo Henley Hunt, Encino, Calif.

[73] Assignee: The Hunt Group, Santa Monica, Calif.

[21] Appl. No.: 755,906

[22] Filed: Nov. 25, 1996

[51] Int. Cl.$^6$ .................................................. B42D 15/00
[52] U.S. Cl. ............................ 283/117; 281/38; 283/86
[58] Field of Search ........................ 283/117, 86; 281/38

[56] References Cited

U.S. PATENT DOCUMENTS

| 422,522 | 3/1890 | Hagelberg . | |
|---|---|---|---|
| 2,038,022 | 4/1936 | Zubli . | |
| 2,225,307 | 12/1940 | Kreeger . | |
| 2,314,629 | 3/1943 | Pickley . | |
| 3,633,301 | 1/1972 | Calabuig . | |
| 5,022,682 | 6/1991 | Desmond . | |
| 5,031,935 | 7/1991 | D'Andrea | 281/38 |
| 5,080,590 | 1/1992 | Frisque | 281/38 |
| 5,120,090 | 6/1992 | Reinl | 283/117 |
| 5,333,907 | 8/1994 | Schaeffer . | |
| 5,490,739 | 2/1996 | Olson . | |
| 5,551,730 | 9/1996 | Barreca et al. | 283/117 |

Primary Examiner—Daniel W. Howell
Assistant Examiner—Adesh Bhargava
Attorney, Agent, or Firm—Oppenheimer Woliff & Donnelly LLP

[57] ABSTRACT

A children's book is enhanced with hologram features to increase the level of a child's interest in the book. The hologram children's book includes a cover portion having a front cover, a back cover, and a spine formed therebetween. A plurality of leaves are bound to the cover portion. Each of the leaves includes a recto sheet and a verso sheet. A plurality of windows are formed in the recto and verso sheets of the leaves. A plurality of hologram sheets are respectively disposed adjacent to the windows, between the recto and verso sheets. Each window and corresponding hologram sheet defines a hologram feature. The windows and hologram sheets may be configured so that one side of the hologram sheet is visible through a window formed in a recto sheet of a leaf, while the other side of the hologram sheet is visible through a window formed in the verso sheet of the same leaf. The children's book may also have a hologram feature formed in the cover portion. The hologram features are preferably configured to complement and/or correspond to graphics and/or text printed on the recto and verso sheets of the leaves.

20 Claims, 3 Drawing Sheets

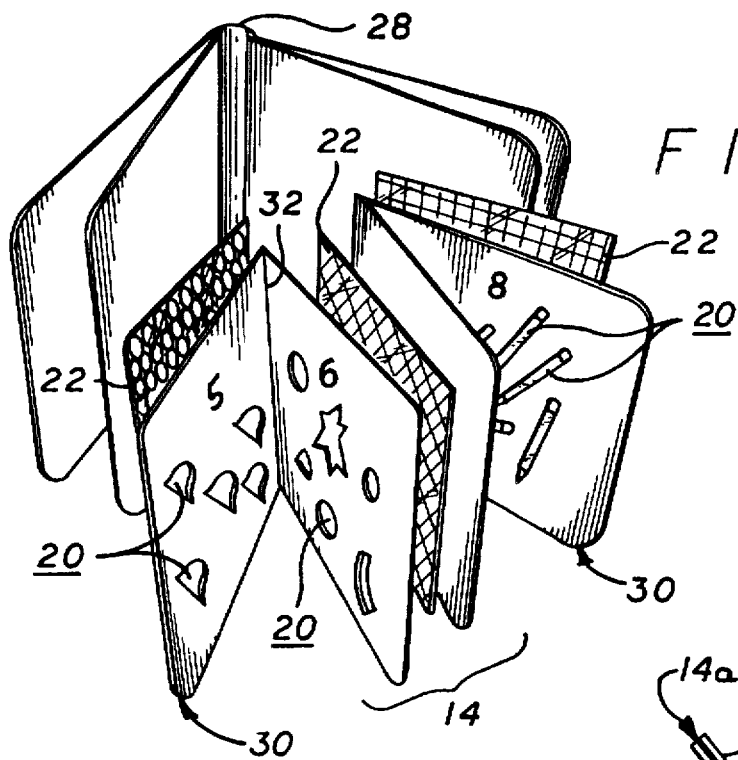
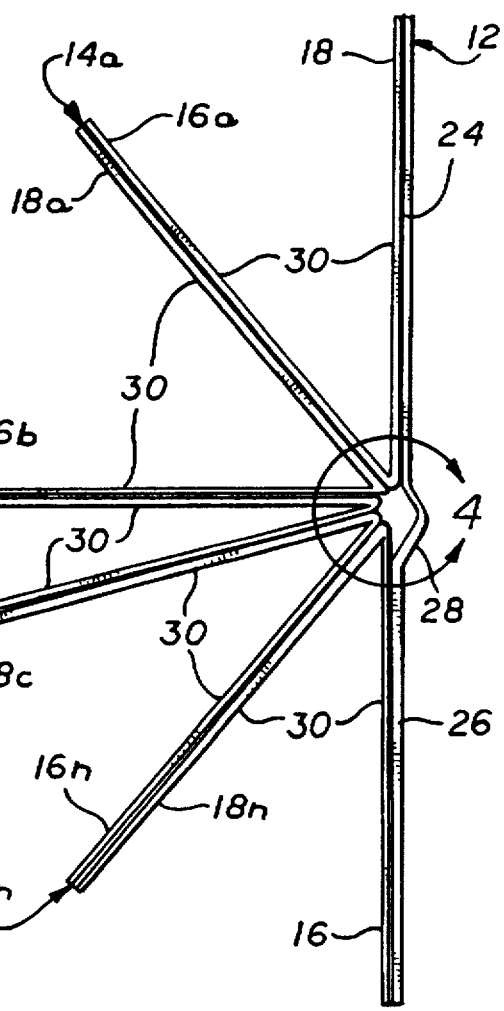
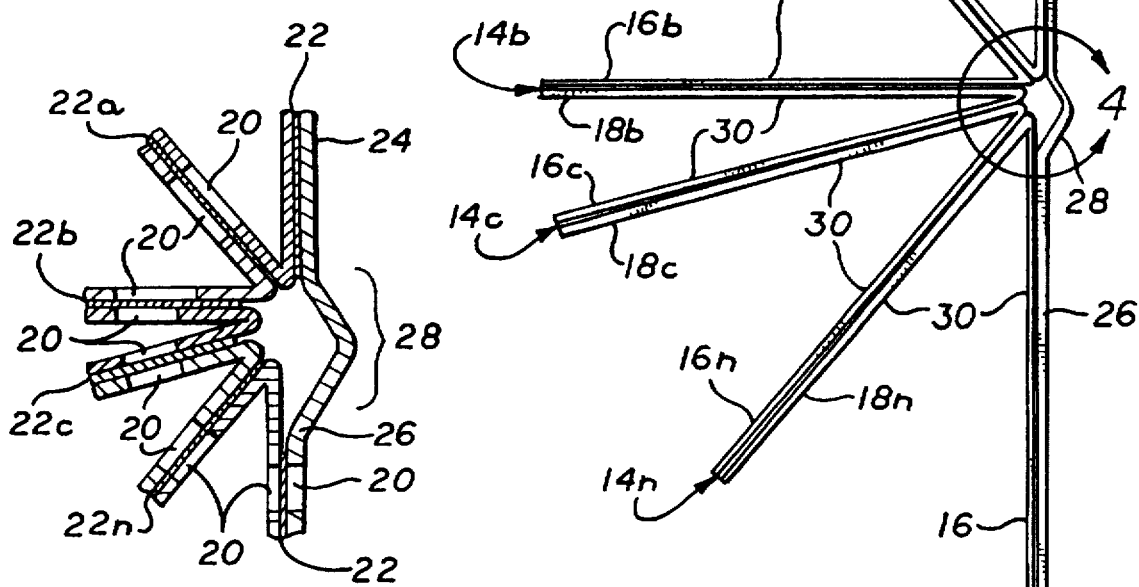

CHILDREN'S BOOK WITH HOLOGRAM FEATURES

FIELD OF THE INVENTION

The present invention relates to books and particularly to children's books having pages enhanced with hologram features.

BACKGROUND OF THE INVENTION

The market for children's books is highly competitive. Publishers are constantly developing features for books which they believe children will find appealing. Many of these features are mechanically oriented and are known as "pop-up" features. The pop-up features are sophisticated arrangements of cut paper which are activated either by the turning of pages or by the interaction of the reader.

Books intended for young children are often designed to be educational. The books are useful in teaching young children elementary concepts such as counting, shapes, and so on. Sophisticated pop-up features may not be particularly economical or practical as interest-grabbing features for books intended for young children. Accordingly, other features which are not only durable and inexpensive but also constitute interesting alternatives, would be desirable.

SUMMARY OF THE INVENTION

According to a primary aspect of the present invention, a children's book is enhanced with hologram features to increase the level of a child's interest in the book. The hologram features are preferably configured to complement and correspond to graphics and text printed on pages of the children's book. Further, a single hologram sheet may be viewed from two consecutive pages of the book, providing different appearances as it is viewed from opposite sides. Accordingly, the hologram features enhance the graphics and text of the book and capture a child's interest in the subject matter of the book, which is helpful in the learning process.

The children's book with hologram features illustrating principles of the present invention includes a cover portion having a front cover, a back cover, and a spine formed therebetween. A plurality of leaves are bound to the cover portion. Each of the leaves includes a recto sheet and a verso sheet. Windows are formed in the recto and verso sheets of the leaves. A corresponding number of hologram sheets are respectively disposed adjacent to the windows, between the recto and verso sheets. Each window and corresponding hologram sheet defines a hologram feature. The children's book may also have a hologram feature formed in the cover portion.

One of the features of the children's book of the invention is that each of the hologram sheets may have a respective design and/or color. Accordingly, each hologram feature will appear different from the other hologram features in configuration and may also be different in hologram design. The hologram sheets are preferably made from a foil material so as to have luster or sheen, and the opposite sides of each hologram sheet may be a different color.

One of the advantages of the present invention is that the hologram children's book may be easily and inexpensively made. The leaves of the hologram children's book may be formed by a plurality of sheet members. Each of the sheet members includes the verso sheet of one of the leaves and the recto sheet of the subsequent leaf. A fold line is defined between the verso sheet and the recto sheet of each sheet member. To form the book, the verso sheet of one of the sheet members is bound to the recto sheet of a subsequent sheet member, with the hologram sheet positioned therebetween. Further, the verso sheet of the first sheet member is bound to the front cover, and the recto sheet of the last sheet member is bound to the back cover.

In accordance with another aspect of the invention, a book illustrating principles of the invention includes leaves or pages each of which includes an apertured paper or cardboard sheet and an adjacent hologram sheet, with the hologram sheet being visible from both side of the leaf or page and providing a different appearance or configuration on each side of the page or leaf.

Other aspects, features, and advantages of the present invention will become apparent to those skilled in the art from a reading of the following detailed description with reference to the accompanying drawings.

BRIEF DESCRIPTION OF THE DRAWINGS

FIG. 2 is a top view of the hologram children's book of the present invention, particularly illustrating page construction;

FIG. 3 is an exploded view of the hologram children's book, illustrating construction principles of hologram features of the pages;

FIG. 4 is an enlarged fragmentary cross-sectional view of the hologram children's book taken along line 4—4 of FIG. 3;

DETAILED DESCRIPTION OF THE PREFERRED EMBODIMENTS

Figure 1:
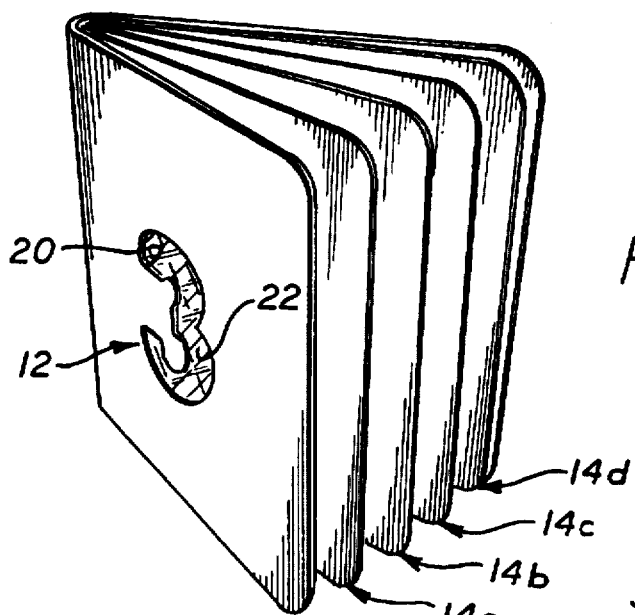
FIG. 1 is a perspective view of a hologram children's book in accordance with a preferred embodiment of the present invention.

Referring to the drawings, a children's book 10 with hologram features is shown in accordance with a preferred embodiment of the present invention. As shown in FIG. 1, the book 10 includes a cover portion 12 and a plurality of leaves bound to the cover portion 12. The leaves are generally indicated by reference numeral 14, and each of the leaves is specifically indicated by reference number 14 followed by an corresponding alpha a, b, c, . . . n, yielding 14a, 14b, 14c, . . . 14n for the leaves. This numbering convention will be followed analogously throughout this description for other elements.

With additional reference to FIGS. 2 and 3, each of the leaves 14 includes a recto sheet 16 and a verso sheet 18. Either one of the sheets 16 and 18, but preferably both, has a window 20 formed therethrough. A hologram sheet 22 is positioned adjacent to the window 20 between the recto and verso sheets 16 an 18 of the leaf 14 so that the hologram sheet 22 is visible through the window 20. As mentioned, it is preferable for both the recto sheet 16 and the verso sheet 18 to have a window 20 formed therethrough. Accordingly, with the hologram sheet 22 positioned between the recto and verso sheets 16 and 18, one side of the hologram sheet 22 is visible through the window 20 formed in the recto sheet 16 of the leaf 14, and the other side of the hologram sheet 22 is visible through the window 20 formed in the verso sheet 18 of the same leaf 14. With such a configuration, it is preferable for each side of the hologram sheet 22 to have a different design so that a different hologram feature is effected on consecutive pages of the book 10.

The hologram sheet 22 is made from sheet material on which a hologram is formed. Holograms are three-dimensional pictures or images that provide a different perspective depending upon the angle at which the viewer looks at the image. The term leaves is defined as the trimmed sheets of paper which typically make up a book. The term recto is defined as the side of a leaf that lies to the right in an open book (i.e., the front of the leaf), and the term verso is defined as the side of a leaf that lies to the left in an open book (i.e., the back of a leaf). A page is one side of a leaf, such that rectos are odd-numbered pages and versos are even-numbered pages.

As particularly shown in FIG. 3, the recto and verso sheets 16 and 18 may each have a plurality of windows 20 formed therethrough, with the hologram sheet 22 configured to be positioned adjacent to all of the windows 20, which will be discussed in more detail below. Each window 20 and corresponding hologram sheet 22, or one side of a corresponding hologram sheet 22, defines a hologram feature of the book 10.

The cover portion 12 may include a front cover 24, a back cover 26, and a spine 28 formed between the covers 24 and 26. The plurality of leaves 14 are preferably formed by a plurality of sheet members 30. Each of the sheet members 30 defines the verso sheet 18 of one of the leaves 14 and the recto sheet 16 of the subsequent leaf 14. For example, one of the sheet members 30 defines both recto sheet 18a of leaf 14a and verso sheet 16b of leaf 14b, and so on. Accordingly, each leaf 14 is formed by the recto sheet of one sheet member 30 being bound to the verso sheet of the subsequent sheet member 30. Each of the sheet members 30 has a fold line 32 defined between the verso sheet 18 and the recto sheet 16 thereof.

The verso sheet 18 of the first sheet member 30 of the book 10 is bound to the front cover 24, and the recto sheet 16 of the last of the sheet members 30 is bound to the back cover 26. Further, either or both of the covers 24 or 26 may also have a window 20 formed therethrough, as shown in FIGS. 1 and 4. Accordingly, a hologram sheet 22 may then be disposed between the front cover 24 and the verso sheet 18 bound thereto or between the back cover 26 and the recto sheet 16 bound thereto to form a hologram feature in the cover portion 12.

Figure 5:
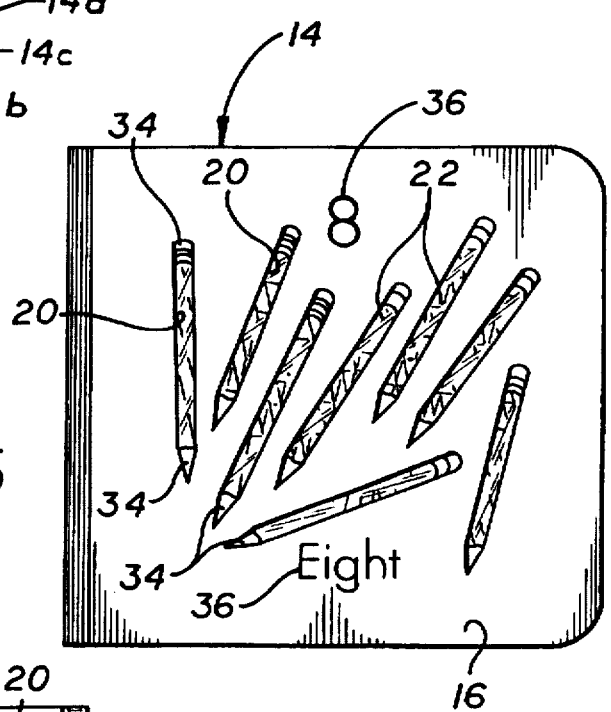
FIG. 5 is a plan view of a page of the hologram children's book of the present invention, illustrating a recto page.
Figure 6:
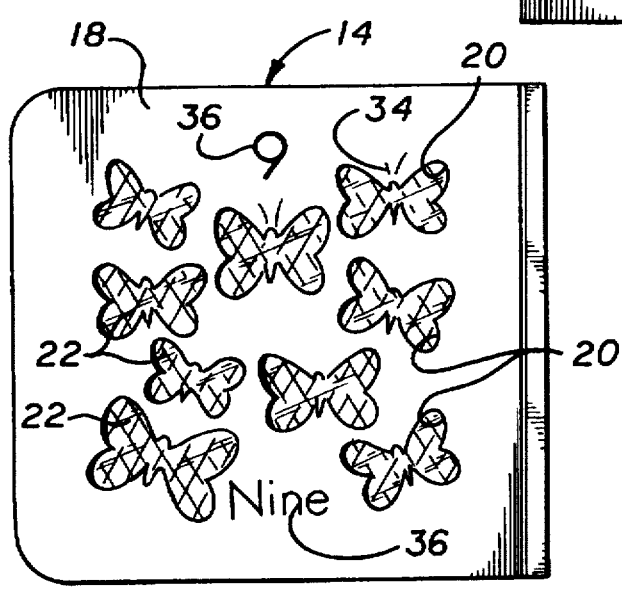
FIG. 6 is a plan view of a page of the hologram children's book of the invention, illustrating a verso page.

With additional reference to FIGS. 5 and 6, preferred embodiments of the hologram children's book of the present invention are shown. As mentioned above, the recto sheet 16 and the verso sheet 18 may have a plurality of windows 20 formed therein. As it is preferable to configure the book 10 to appeal to young children or to aid children in the learning process, the windows 20 are preferably configured in the shape of known objects. For example, in FIG. 5 the windows 20 are configured as pencils, and in FIG. 6 the windows 20 are configured as butterflies. Accordingly, with the hologram sheet 22 being visible through the windows 20, a child may find the windows 20 particularly appealing and interesting.

In addition, each of the sheets 16 and 18 may also have illustrations and/or graphics 34 as well as text 36 which correspond to the configuration of the windows 20 and, as shown in FIGS. 5 and 6, which correspond to the number of windows 20. For example, with particular reference to FIG. 5, the windows 20 may each be configured as a body of a pencil, with the hologram sheet 22 visible therethrough, with the illustrations 34 corresponding to the eraser and the sharpened point of the pencil. A child may then also learn the number "8" as well as the word "eight" by counting the number of hologram features, i.e., pencils, formed in the leaf 14.

Figure 7:
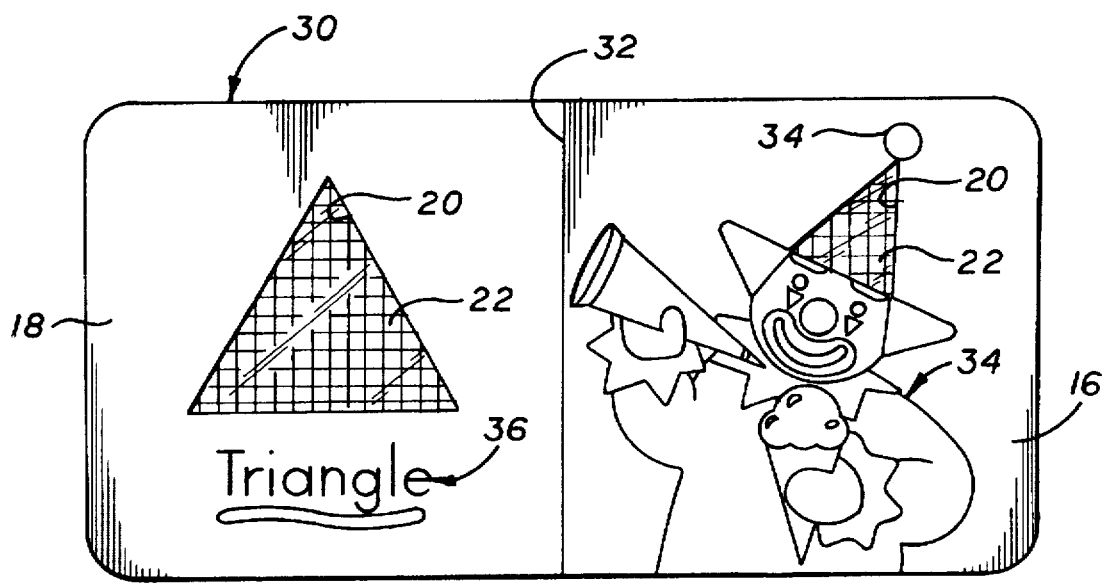
FIG. 7 is a plan view of verso and recto pages of a sheet member of the hologram children's book, illustrating a preferred embodiment of the invention.
Figure 8:
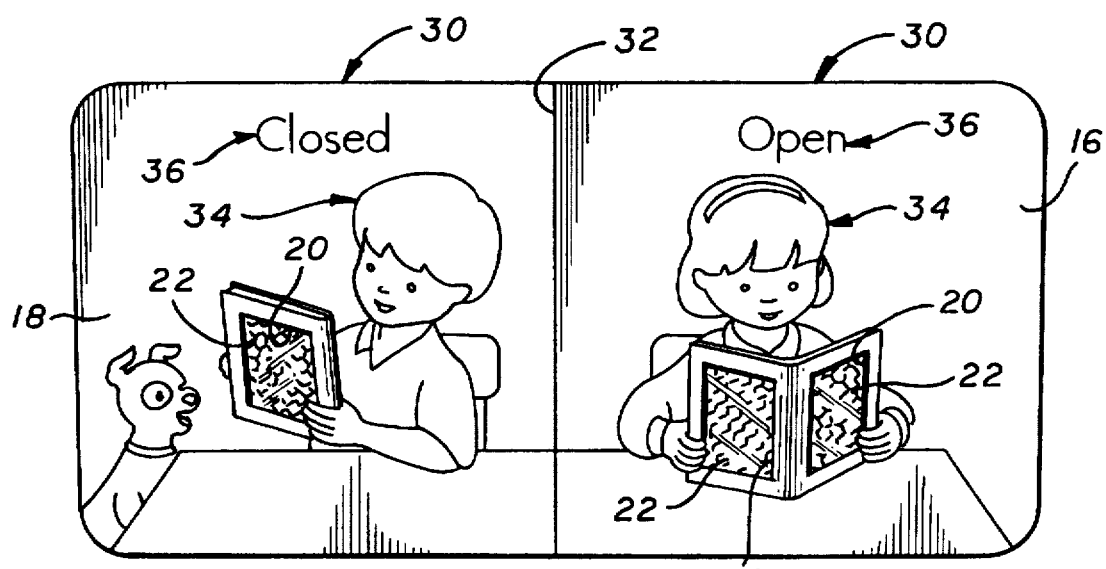
FIG. 8 is a plan view of verso and recto pages of a sheet member of the hologram children's book, illustrating another preferred embodiment of the present invention.

To expand upon this learning concept further, reference is made to FIGS. 7 and 8. In the preferred embodiments illustrated in these FIG. 7, the window 20 formed in the verso sheet 18 corresponds or is complementary to the window 20 formed in the recto sheet 18. For example, if the hologram children's book 10 is intended to teach children shapes of objects, the window 20 formed in the verso sheet 18 may be configured as a common shape, specifically a triangle as shown, with the hologram sheet 22 being visible therethrough to highlight the shape to be taught. The verso sheet 18 may then have text 36 which corresponds to the window 20. Accordingly, the window 20 formed in the recto sheet 16 is correspondingly configured to the verso sheet window, specifically a triangular clown's hat, with the hologram sheet 22 visible therethrough to highlight and accent the shape. Any illustrations 34 provided on the recto sheet 16 may also complement and correspond to the recto sheet window 20, specifically a triangular horn, a triangular ice cream cone, and so on.

In the preferred embodiment illustrated in FIG. 8, the windows 20 respectively formed in the recto and verso sheets 16 and 18 are configured to highlight opposite situations. On the verso sheet 18, the window 20 is configured to shown only one side of a book, with the hologram sheet 22 highlighting the book, and the illustrations 34 and the text 36 corresponding to a "closed" book situation. Accordingly, on the recto sheet 16, the windows 20 are configured to illustrate the opposite of "closed," that is, "open," with the hologram sheet 22 highlighting both covers of the book. Illustrations 34 and text 36 complement the configuration of the windows 20.

Regarding the hologram sheet 22 of the present invention, as illustrated it is preferable to provide a singular hologram sheet 22 adjacent the windows 20 between the recto and verso sheets 16 and 18. Alternatively, multiple hologram sheets 22 may be provided, particularly in those embodiments in which a plurality of windows 20 are formed in the sheets 16 and 18, with each window 20 having a dedicated hologram sheet 22. Each of the hologram sheets 22 may have a different color or design, thereby effecting a more interesting feature to grab a child's interest. As shown in, for example, FIGS. 5 and 6, the hologram sheets 22 respectively provided in different pages may have different designs and/or images formed thereon. Further, the hologram sheets 22 are preferably made from foil sheet material which may have different colors on either side thereof; accordingly, the side of the hologram sheet 22 visible through a window of a recto sheet 16 of a leaf 14 may be one color, while the side of the same hologram sheet 22 visible through the window formed in the verso sheet 18 of the same leaf 14 may be a different color. Being made from a foil material, the hologram sheets 22 have a luster or a sheen to them, which further accentuates the hologram features. One supplier of preferred hologram foil material from which the hologram sheets 22 may be made is Pal Up Taiwan Company, Ltd., located at 1Fl., No. 53 Lane 405, Chung Shan North Road, Section 6, Taipei, Taiwan, R.O.C. Alternatively, the hologram sheets 22 may be made from other suitable sheet material such as film, plastics, paper, and so on.

As the hologram children's book 10 is intended for young children or toddlers, it is preferable for the book 10 to be made from substantially rigid or stiff paper material, such as pressboard. Accordingly, each of the leaves 14 are also preferably rigid so that a child may not tear or easily damage the book 10. Further, as the hologram sheets 22 are preferably made from a foil-type material, the hologram sheets 22 are also durable and are neither easily torn or damaged by careless children nor susceptible to damage by liquids.

Those skilled in the art will understand that the preceding preferred embodiments of the present invention exemplify the principles of the invention and do not limit the scope of the invention to that specifically shown and described. The preferred embodiments provide a foundation from which numerous alternatives and modifications may be made. Thus, by way of example and not limitation, the hologram children's book 10 may also incorporate mechanical features, commonly known as "pop-up" features in the leaves 14 in addition to the hologram features described above. Accordingly, a book according to the principles of the present invention may be configured to appeal to a child on an even higher level. Further, in addition to books, the hologram features of the present invention (that is, the windows 20 and the hologram sheets 22 are also readily applicable to greeting cards, display arrangements, advertising devices, and other devices in which hologram features may enhance the appearance thereof. In addition, each leaf could be formed of a single apertured sheet, and a hologram sheet, either a full sheet or an appropriately configured partial sheet (in any desired form, such as a triangle, circle, etc.) secured to cover the aperture, with appropriate text on both sides of the leaf. Still further, each of the leaves may be substantially solid, i.e., without a window, so that the hologram features are formed simply by adhering hologram sheets 22, preferably configured in desired shapes, to the recto and verso surfaces of the leaves 14. These and other alternatives and modifications are also within the scope of the present invention as set forth in the following claims.

What is claimed is:

1. A book with hologram features, comprising:
a) a cover portion including a front cover, a back cover, and a spine formed between said covers;
b) a plurality of leaves bound to said cover portion, each of said leaves including a recto sheet and a verso sheet;
c) a plurality of windows formed in said recto and verso sheets of said leaves; and
d) a plurality of hologram sheets respectively disposed adjacent to said windows between said recto and verso sheets, each said hologram sheet having two sides, each said window and one of said sides of a corresponding said hologram sheet defining a hologram feature;
one of said sides of each said hologram sheet being visible through one of said windows formed in said recto sheet of one of said leaves, and the other said side of each said hologram sheet being visible through one of said windows formed in said verso sheet of the same said leaf.

2. A book according to claim 1 wherein a hologram feature is formed in said cover portion.

3. A book according to claim 1 further comprising graphics or text printed upon said recto and verso sheets of said leaves.

4. A book according to claim 3 wherein said hologram features are configured to correspond to said graphics or text.

5. A book according to claim 1 wherein each of said hologram sheets has a respective design or color.

6. A book according to claim 1 wherein said hologram sheets are made from a foil material.

7. A hologram book comprising:
a) a cover portion;
b) a plurality of leaves bound to the cover portion, each of the leaves including a recto sheet and a verso sheet, at least one of the recto and verso sheets having a window formed therethrough; and
c) a hologram sheet disposed adjacent to the window so that the hologram sheet is visible through the window.

8. The hologram book of claim 7 further comprising a plurality of hologram sheets;
a plurality of the recto and verso sheets having a window formed therethrough;
each of the hologram sheets being disposed adjacent to one of the windows.

9. The hologram book of claim 7 wherein said one of the recto and verso sheets has a plurality of windows formed therethrough;
the hologram sheet being disposed adjacent to the plurality of windows.

10. A hologram book as defined in claim 7 wherein said hologram sheet is colored differently on opposite sides thereof.

11. The hologram book of claim 7 wherein the leaves are formed by a plurality of sheet members;
each of the sheet members including the verso sheet of one of the leaves and the recto sheet of the subsequent leaf;
each of the sheet members including a fold line between the verso sheet and the recto sheet thereof; and
the hologram sheet being disposed between one of the recto sheets and one of the verso sheets.

12. The hologram book of claim 11 wherein the cover portion includes a front cover, a back cover, and a spine formed between the covers;
the verso sheet of a first one of the sheet members being bound to the front cover; and
the recto sheet of a last one of the sheet members being bound to the back cover.

13. The hologram book of claim 12 wherein at least one of the covers has a window formed therethrough;
a hologram sheet being disposed between the cover having the window and the sheet bound thereto.

14. The hologram book of claim 7 wherein the hologram sheet is made from a foil sheet material.

15. The hologram book of claim 7 wherein the sheets have illustrations;
the window being configured to correspond to the illustrations.

16. A method of making a hologram book comprising the steps of:
a) forming a cover portion including a front cover, a back cover, and a spine defined between the front and back covers, the cover portion being formed from a single sheet of material;
b) forming a plurality of sheet members including a verso sheet, a recto sheet, and a fold line defined between the verso and recto sheets, each of the sheet members being formed from a single sheet of material;
c) cutting a window in at least one of the recto and verso sheets of at least one of sheet members;

d) positioning a hologram sheet adjacent to the window;

e) binding the recto sheet of each of the sheet members to the verso sheet of one of the sheet members, the hologram sheet being positioned between on of the recto sheets and one of the verso sheets, a first sheet member having the verso sheet thereof unbound and a last sheet member having the recto sheet thereof unbound; and f) binding the verso sheet of the first sheet member to the front cover and binding the recto sheet of the last sheet member to the back cover.

17. The method of claim 16 further comprising the step of: providing graphics or text to the recto and verso sheets which correspond to the configuration of the window.

18. The method of claim 16 wherein the cutting step includes the step of:

cutting a plurality of windows in at least one of the recto and verso sheets.

19. The method of claim 16 further comprising the steps of:

cutting a window in at least one of the covers of the cover portion; and positioning a hologram sheet adjacent to the window cut in the cover portion.

20. The method of claim 16 wherein:

the cutting step includes the steps of cutting a window in the recto sheet of one of the leaves and cutting a window in the verso sheet of the same leaf; and the positioning step includes the step of positioning a hologram sheet adjacent to the windows formed in the recto and verso sheets of the same leaf;

whereby one side of the hologram sheet is visible through the window formed in the recto sheet of the leaf, and the other side of the hologram sheet is visible through the window formed in the verso sheet of the leaf.

* * * * *